May 18, 1937.  W. G. GOW  2,080,660
CELL BLOCK
Filed Sept. 11, 1936
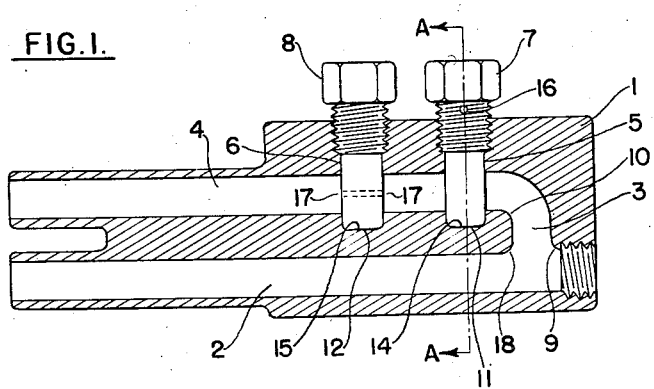
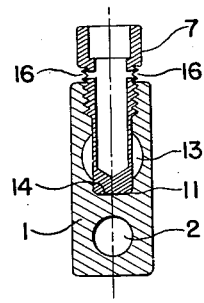
INVENTOR.
WILLIAM GEORGE GOW
BY Henry T. Kilburn
ATTORNEY.

Patented May 18, 1937

2,080,660

UNITED STATES PATENT OFFICE 2,080,660

CELL BLOCK

William George Gow, Belleville, N. J., assignor to Gow-Mac Instrument Company, Newark, N. J., a partnership composed of said William George Gow and James L. MacFadden Application September 11, 1936, Serial No. 100,241

4 Claims. (Cl. 73—51)

This invention relates to a cell block for apparatus for analyzing gases by the thermal conductivity method.

Gas analyzing apparatus in which the thermal conductivity of the gases to be analyzed is compared with the thermal conductivity of a standard gas has long been in use. In this apparatus the gases to be analyzed are introduced into a cell containing a resistor through which an electric current is passed. The dissipation of the heat generated by the electric current passing through the resistor surrounded by the unknown mixture of gases is compared with the dissipation of the heat caused by a similar resistor in an atmosphere of a standard gas. This heat dissipation is measured by the change in resistance of the resistor elements which may be determined by a Wheatstone bridge or other suitable electrical measuring arrangement. It is necessary to have each resistor in a confined atmosphere of the gases so that error will not be caused due to the heat which the gases would carry away if either or both of them were flowing past the resistors with substantial velocity. In analyzing a flowing gas, it is, therefore, necessary to put the resistor in a cell which is located in a branch or by-pass to the path of the main flow of the gas.

In practice, it is desirable to have apparatus with which test runs may be made in rapid succession. For this to be done, it is necessary that the cell for the gases to be analyzed be rapidly cleaned out and that the passages in the cell block leading into the cell for the gases to be analyzed offer no pockets where gases may remain from the previous test. In apparatus on the market this rapid cleaning out is not accomplished. The result is that in operating such apparatus one must wait several minutes between tests to allow all of the gases which were introduced during the preceding test to be cleaned out.

It is an object of this invention to provide a cell block in which the cells and gas passages are so arranged that the gas is rapidly cleaned out upon completion of a test.

It is a further object of this invention to provide a cell block in which the temperature of the cell for the standard gas is substantially the same as that of the cell for the gases to be analyzed.

It is a further object of this invention to provide a cell block which is self-draining so that any moisture which may be formed will not come in contact with the resistors in the gas cells and cause a short circuit.

It is a further object of the invention to provide an arrangement of gas cells in which the rate of dissipation of heat from the resistors is equal in all respects, except as affected by the difference in the composition of the standard gas and the gases to be analyzed.

Other objects of the invention will become apparent from a consideration of the following specification, taken in conjunction with the accompanying drawing and the appended claims.

Referring to the drawing, Fig. 1 represents a central vertical sectional view of a gas analysis cell block with the cells therein embodying one form of the invention and Fig. 2 represents a vertical sectional view on the line A—A of Fig. 1.

The cell block which is generally designated as 1 may be of any metal which has fair heat conductivity and which will not be attacked by the gases to be analyzed. As shown in Fig. 1, it has a main passageway 2 through which the gases to be analyzed pass from right to left and near the right-hand end of this passageway is a branch 3 leading to a gas chamber 4. The branch 3 is arcuate in shape and in order that the change in direction of the flow of the gas is not too abrupt, the radius of this branch 3 should be at least greater than its diameter and the diameter of the passage 2. Corners 18 and 9 formed where the branch 3 leaves the passage 2 should be rounded off. Corner 10 should be rounded off in a similar manner. The branch 3 terminates in a straight portion 4 which forms the gas chamber. Preferably, this should be of about the same diameter as that of the passage 2.

Transversely to the gas chamber 4, two openings 5 and 6 are drilled in the cell block. Gas cells 7 and 8 containing the resistors are inserted in these openings 5 and 6 and may be secured therein in any suitable manner, such as by threading these openings and having the top of the cells formed as a threaded bolt. The horizontal diameter of the gas chamber 4 is slightly increased for a portion of its length as shown at 13 so that the gases may flow past the gas cells 7 and 8. The gas cells are preferably cylindrical in form and are made with flat bottoms 14 and 15. Two flat circular recesses 11 and 12 are formed in the bottom of the chamber 4 into which the flat bottoms 14 and 15 of the gas cells fit snugly.

The cell block for the standard gas is closed to the entrance of the gases to be analyzed. In my use of this apparatus, I have used air as the standard gas and there are two small openings 16, 16 in the upper portion of this cell. These openings are above the cell block and open the cell to the atmosphere.

The cell for the gases to be analyzed has two openings 17, 17 which are in that portion of the gas cell which is in the chamber 4. This permits the gases to be analyzed to pass into this cell. This cell is not open to the atmosphere. The provision of the openings 16, 16 in the standard cell aid in making the heat dissipation characteristics of that cell similar to those of the cell for the gases to be analyzed.

Most of the gases to be analyzed flows through the passageway 2 but some flows up through the branch 3 and into the chamber 4 past the cell 7 and into the cell 8. After this, it passes on to the outlet of the chamber 4. This portion of the gases, however, travels at a much smaller velocity than that of the portion which goes directly through the passageway 2. Thus, the gases surrounding the cell 7 and entering the cell 8 may be said to be more or less at rest. However, it has some slight velocity of flow and when the test is completed it is cleaned out of the chamber 4 and the cell 8 within a very few seconds.

It is to be noted that the arrangement of the cells and the shape of the portion 3 and chamber 4 are such that no pockets are formed in which the gases may remain and at no point is the direction of flow of the gases rapidly changed.

While a preferred embodiment of the present invention has been hereinbefore described, it will be readily apparent that many and various changes and modifications in form, structure and arrangement of the parts may be made without departing from the spirit of the invention and it will be understood that all and any such changes and modifications are contemplated as a part of this invention as defined in the appended claims.

What I claim is:

1. A cell block for gas analysis apparatus of the thermal conductivity type comprising a straight passageway for the gases to be analyzed, a curved branch leading therefrom to a gas chamber, gas analysis cells disposed in and extending across said gas chamber, each of said cells containing a resistor and having a flat end, said ends being fitted in and completely filling recesses in the bottom wall of said chamber.

2. A cell block for gas analysis apparatus of the thermal conductivity type comprising a block of metal with paths therein for the gases to be analyzed, gas analysis cells containing resistors located in one of said paths, said cells being of a cylindrical shape and extending completely across said path with their ends fitted in recesses in the wall of said path so that no pockets out of which gases will not readily flow are formed around said cells, said paths being connected by a path of arcuate shape and said path and cells being surrounded by a relatively large mass of metal.

3. A cell block for gas analysis apparatus of the thermal conductivity type comprising a block of metal with two paths therein for the gases to be analyzed, one of said paths extending for the length of said block and the other terminating in an arcuate section connecting it with said first path and forming a gas chamber at the other end of said arcuate portion, there being two flat circular recesses in the bottom wall of said other path and two openings arranged transversely to and running into said other path opposite said recesses, gas cells containing resistors and having flat ends adapted to be inserted in said openings and to have said flat ends fit into said recesses and completely fill them so that no pockets are formed.

4. A cell block for gas analysis apparatus of the thermal conductivity type comprising a block of metal with two paths therein for the gases to be analyzed, one of said paths extending for the length of said block and the other terminating in an arcuate section connecting it with said first path and forming a gas chamber at the other end of said arcuate portion, there being two flat circular recesses in the bottom wall of said other path and two openings arranged transversely to and running into said other path opposite said recesses, two gas analysis cells containing resistors, one of said cells being open to the gases in said gas chamber and closed to atmosphere and the other of said cells being closed to said gases and open to atmosphere, both of said cells having flat ends adapted to be inserted in said openings and to have said flat ends fit into said recesses and completely fill them so that no pockets are formed.

WILLIAM GEORGE GOW.